J. N. Cherry,
Shearing Sheet Metal,
N° 44,516
Patented Oct. 4. 1864.

WITNESSES:
Wm. H. McNamara
J. P. Hall

INVENTOR:
Jas. N. Cherry
per Munn & Co.
Attorneys.

UNITED STATES PATENT OFFICE.

JAMES N. CHERRY, OF ZANESVILLE, OHIO.

IMPROVED MACHINE FOR CUTTING SHEET METAL.

Specification forming part of Letters Patent No. 44,516, dated October 4, 1864.

*To all whom it may concern:*

Be it known that I, JAMES N. CHERRY, of Zanesville, in the county of Muskingum and State of Ohio, have invented a new and Improved Machine for Cutting Sheet Metal; and I do hereby declare that the following is a full, clear, and exact description thereof, which will enable others skilled in the art to make and use the same, reference being had to the accompanying drawings, forming part of this specification, in which—

Figure 1:
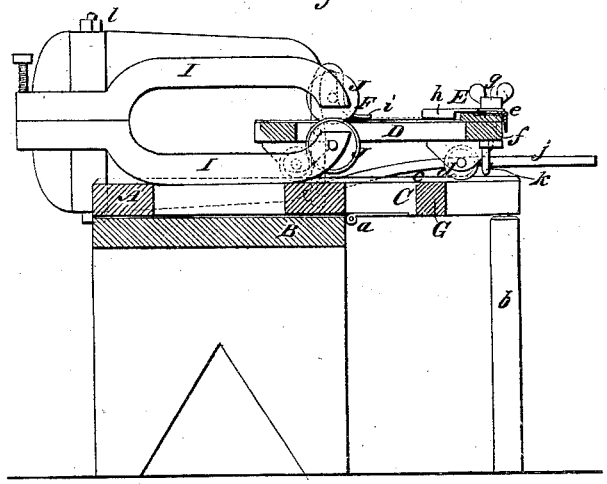
Figure 2:
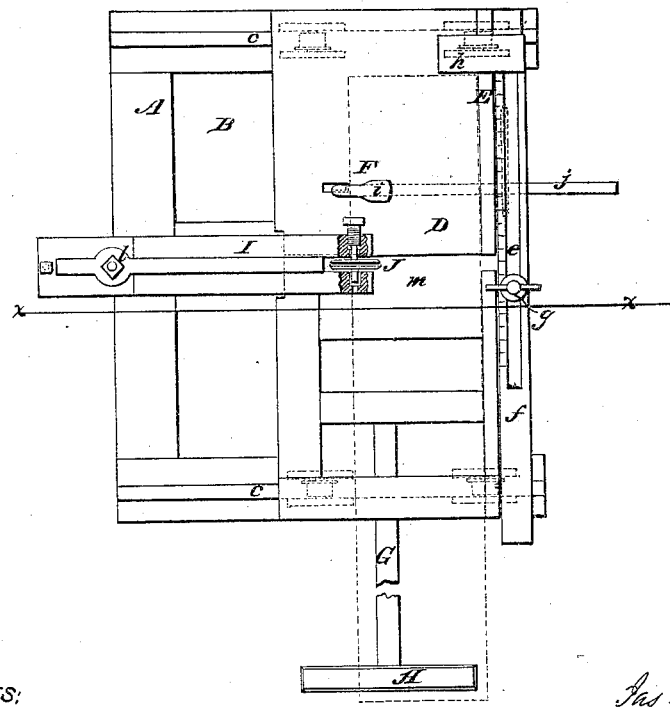

Figure 1 is a side sectional view of my invention, taken in the line $x$ $x$, Fig. 2; Fig. 2, a plan or top view of the same.

Similar letters of reference indicate like parts.

This invention relates to a new and improved machine for cutting sheet metal, such as sheet iron, zinc, copper, &c., for the manufacture of stove-pipes, pans, &c.

The object of the invention is to obtain a machine for the purpose specified, which will supersede the ordinary hand-shears now employed at a considerable expenditure of time and labor.

A represents a rectangular frame, which is secured by bolts or otherwise to a bench, B, or any suitable support, and C is a continuation of the frame A, the former being secured to the latter by hinges or joints $a$. The part C of the frame, when the machine is in use, is supported in a horizontal position and in the same plane with A by means of uprights $b\ b$. (See Fig. 1.)

On the parts A C, near each end, there are secured ways or guides $c\ c$, on which the wheels $d$ of a carriage, D, are fitted and work. This carriage is provided with an adjustable or sliding gage, E, and also with a clamp, F. The gage E is of the kind usually employed for such purposes, being composed of a graduated bar, $e$, fitted on a way or guide, $f$, and secured at any desired point by a set-screw, $g$, said bar having an arm, $h$, attached to it at one end at right angles. (See Fig. 2.) The clamp F is composed of a curved bar, $i$, which is pivoted underneath the carriage, extends up through it, and has a rod, $j$, attached by a pivot to its lever end, said rod being provided with a notch in its under side and near its outer end, and fitted on an inclined bar, $k$, on which it may be moved to the right or left to bring down or raise the bar $i$ in order to secure the metal plate to be cut on the carriage or release it therefrom.

To one end of the carriage D there is attached a bar, G, which has an arm, H, fitted on it at right angles, said arm being allowed to slide freely on the bar G.

I I represent two cast-iron bars, both of the same pattern, and secured together at one end by a bolt, $l$, the lower bar being firmly secured to the frame A. These bars are slightly curved at their inner surfaces and they have each a circular steel cutter, J, fitted in them at one end, said cutters being one over the other and forming rotary shears.

An opening or slot, $m$, is made in the carriage D, to admit of the latter being shoved back and forth to feed the sheet-metal plate to the cutters.

The operation is as follows: The part C of the frame is raised and adjusted in proper position, and the uprights $b\ b$ are placed underneath them. The carriage D is then placed on the part C or drawn out thereon, the gage $e$ properly adjusted to suit the dimensions of the pieces into which the sheet-metal plate is to be cut. The sheet-metal plate is then laid on the carriage and made to rest snugly against the arm $h$ of the gage at its right-hand end, its left-hand end being supported by the bar H. The clamp H is then adjusted to secure the plate on the carriage and the latter is shoved forward, the plate passing between the cutters or rotary shears which cut the metal. The carriage D is then drawn back, the plate adjusted as before, and the carriage again shoved forward for a succeeding cut. In case the metal plate is not square, it is made so previous to the commencement of the above-described operation by turning its right-hand edge with the outer edge adjusted in contact with the way or guide $f$ of the gage.

The cutters J may be adjusted to overlap each other more or less by means of a set-screw, $a^\times$, at the back part of the upper bar I.

I claim as new and desire to secure by Letters Patent—

The cast-iron bars I I, provided with the rotary shears J J', in combination with the carriage D, placed on ways or guides on the frames A C, and provided with the gage E and clamp F, all arranged to operate substantially as and for the purpose set forth.

2. The bar G, attached to the carriage D, and provided with the arm H, substantially as and for the purpose specified.

JAMES N. CHERRY.

Witnesses:
J. T. FARRELL,
F. A. SEBORN.